United States Patent
Haumont

(10) Patent No.: US 8,706,114 B2
(45) Date of Patent: Apr. 22, 2014

(54) HANDOVER OF A COMMUNICATION DEVICE

(75) Inventor: Serge Haumont, Helsinki (FI)

(73) Assignee: Nokia Corporation, Espoo (FI)

( * ) Notice: Subject to any disclaimer, the term of this patent is extended or adjusted under 35 U.S.C. 154(b) by 1132 days.

(21) Appl. No.: 11/621,742

(22) Filed: Jan. 10, 2007

(65) Prior Publication Data

US 2008/0002612 A1    Jan. 3, 2008

(30) Foreign Application Priority Data

Jun. 30, 2006    (GB) .................................. 0613116.3

(51) Int. Cl.
- *H04W 36/00* (2009.01)
- *H04W 4/00* (2009.01)
- *H04W 36/24* (2009.01)
- *H04W 36/22* (2009.01)
- *H04W 36/14* (2009.01)
- *H04W 36/36* (2009.01)

(52) U.S. Cl.
CPC .............. *H04W 36/24* (2013.01); *H04W 36/22* (2013.01); *H04W 36/14* (2013.01); *H04W 36/0022* (2013.01); *H04W 36/36* (2013.01)
USPC .......................................... 455/436; 370/331

(58) Field of Classification Search
CPC . H04W 36/14; H04W 36/0022; H04W 36/22; H04W 36/36
USPC ........... 455/436; 370/352, 338, 349, 335, 331
See application file for complete search history.

(56) References Cited

U.S. PATENT DOCUMENTS

| | | | |
|---|---|---|---|
| 2001/0009853 A1* | 7/2001 | Arimitsu | 455/434 |
| 2002/0093936 A1* | 7/2002 | Chuah | 370/349 |
| 2002/0154627 A1* | 10/2002 | Abrol et al. | 370/352 |
| 2004/0180701 A1* | 9/2004 | Livet et al. | 455/574 |
| 2005/0090259 A1* | 4/2005 | Jain et al. | 455/439 |
| 2005/0227692 A1 | 10/2005 | Kawashima et al. | |
| 2007/0173283 A1* | 7/2007 | Livet et al. | 455/552.1 |
| 2007/0263574 A1* | 11/2007 | Lu et al. | 370/338 |

FOREIGN PATENT DOCUMENTS

| | | |
|---|---|---|
| EP | 1 424 862 A1 | 6/2004 |
| EP | 1 526 752 A2 | 4/2005 |
| WO | WO-96/28947 A1 | 9/1996 |

OTHER PUBLICATIONS

Murray et al., "State of the Art: Admission Control and Mobility Management in Heterogeneous Wireless Networks", State of Art Surveys: Release 2: May 2003, pp. 4-15.*

International Search Report for PCT/IB2007/001894, dated Oct. 19, 2007.

* cited by examiner

*Primary Examiner* — Opiribo Georgewill
(74) *Attorney, Agent, or Firm* — Alston & Bird LLP

(57) ABSTRACT

An apparatus is provided that includes a controller configured to detect at least one predefined event and, in response to the detection of the predefined event, to trigger a handover of the communication device from a first access system to a second access system on the basis of the power efficiency of the second access system. The predefined event may be in communications between a communication device and a communication system and/or may be in relation to power consumption. Corresponding communication systems, methods and controllers are also provided.

33 Claims, 3 Drawing Sheets

| VPN Keep-alive Interval [s] | Current consumption in 2G [mA] | Current consumption in 3G [mA] |
|---|---|---|
| 20 | 29 | 34 |
| 40 | 15.5 | 24.4 |
| 150 | 9.1 | 15.7 |
| 300 | 7.3 | 13.5 |
| Infinite | 5.2 | 6.1 |

HANDOVER OF A COMMUNICATION DEVICE

FIELD OF THE INVENTION

The present invention relates generally to handover of a communication device, and in particular to determination if a communications device should be handed from an access system over to another access system.

BACKGROUND OF THE INVENTION

A communication device is a device provided with appropriate communication and control capabilities for enabling use thereof for communication with others devices. The communication may comprise, for example, communication of voice, electronic mail (email), text messages, data, multimedia and so on. The communication device may comprise any device facilitating sending and/or receiving communication, for example an appropriate user equipment (mobile or fixed), a mobile station and so on.

A communication device typically enables a user of the device to receive and transmit communication via a communication system. A communications system is a facility which facilitates the communication between two or more entities such as communication device, network entities and other nodes.

An appropriate access network arrangement provides a user with an access to the communications system. An access network typically operates in accordance with a given standard or with a given set of specifications which set out what the various elements of the system are permitted to do and how that should be achieved. For example, the standard or specification may define if the user, or more precisely user equipment, is provided with a circuit switched bearer or a packet switched bearer, or both. Communication protocols and/or parameters which should be used for the connection are also typically defined. For example, the manner in which communication should be implemented between the user equipment and the elements of the networks is typically based on a predefined communication protocol.

An access to a communications network may be provided by a fixed line or wireless communication interface. Communication systems providing wireless access enable at least some degree of mobility for the users thereof. More advanced mobility support can typically be added as an enhanced feature. An example of communication networks providing wireless access and mobility is a public land mobile network (PLMN), such as the second generation (2G) GSM (Global System for Mobile communications), the so called third generation (3G) GPRS (General Packet Radio Service), and/or the WCDMA (Wideband Code Division Multiple Access) or EDGE (Enhanced Data for GSM Evolution) and so forth.

The public land mobile networks (PLMN) are commonly based on cellular technology. In cellular systems, a base transceiver station (BTS) or similar access entity services mobile communication device via a wireless interface between these entities. The operation of the base station apparatus and other apparatus required for the communication can be controlled by one or several control entities. Other examples of wireless access technologies include various different wireless local area networks (WLANs) and satellite based communication systems.

The various control entities of a communication system may be interconnected. One or more gateway nodes may be provided for connecting a network used for accessing the system to other communication networks, for example to an IP (Internet Protocol) and/or other packet switched data networks. In such arrangements, a communication network provides a user with appropriate user equipment to access external networks, hosts, or services offered by specific service providers.

A mobile communication device may be configured to be compatible with different access technologies and thus capable of communication via a plurality of different access systems. For example, a mobile device may be provided with multi-radio capabilities, thus enabling access to services via a plurality of different radio access networks.

A communication device can be used for accessing various applications. An application may be configured such that although the application is activated, there are idle periods when no payload communication occurs. A plurality of different mechanisms have been developed to avoid dropping of the communication media during these idle periods. One example of these is where an application generates keep alive messages to maintain the communication media for idle communication devices for possible further needs. A keep alive message may be generated in different intervals, depending on the application. For example, a keep alive message may be sent every 20 s to a few minutes.

Sending of keep alive messages, or other dummy messages consumes power and thus reduces battery-life. The repeated signaling may also unnecessarily consume network resources. Problems in relation to power consumption by the mobile device may arise in other contexts as well. For example, a communication device may be provided with a communication media via an access system in an area where power consumption is high in that particular access system, for example due to obstacles in the radio path between the communication device and a base station or because the particular access system is suffering from high level of interference.

In accordance with an embodiment there is provided an apparatus comprising a controller configured to detect at least one predefined event in communications between a communication device and a communication system, and in response to detection of said at least one predefined event to trigger a handover of the communication device from a first access system to a second access system on the basis of the power efficiency of the second access system.

Another embodiment provides a communication device comprising a controller configured to detect at least one predefined event in relation to power consumption thereof, and in response to detection of said at least one predefined event to trigger a handover of the communication device from a first access system to a second access system.

A yet another embodiment provides a communication system comprising at least a first access system and a second access system, and a controller a controller configured to detect at least one predefined event in communications with a communication device via the first access system, and in response to detection of said at least one predefined event to trigger a handover of the communication device from the first access system to the second access system on the basis of the power consumption characteristics of the second access system.

A still further embodiment provides a method comprising monitoring for at least one predefined event in communications between a communication device and a communication system and triggering, in response to detection of said at least one event, a handover of the communication device from a first access system to a second access system on the basis of the power efficiency thereof.

A further embodiment provides a controller configured to detect at least one predefined event in communications between a mobile device and an access system, and in response to detection of said at least one predefined event to trigger a handover of the mobile device from the access system to another access system on the basis of the power efficiency of said other access system.

In a more specific embodiment the controller monitors for the state of the communications between the communication device and the communication system. The controller may monitor for at least one of a predefined pattern of events in the communications, keep alive messages, a predefined traffic pattern, a frequency of predefined events, and a power source.

The controller may change a quality of service parameter allocated to the communication device in response to the predefined event.

The controller may also trigger, in response to detection that the communications between the communications device and the communication system is reactivated, a handover of the communication device from the second access system to the first access system.

The controller may trigger a handover to an access system with a lesser demand for power than in the first access system.

The controller may trigger an intersystem handover in response to detection that the communication device has been idle for a predefined period and that at least one keep alive message has been transmitted.

BRIEF DESCRIPTION OF THE DRAWING(S)

For a better understanding of the present invention and how the same may be carried into effect, reference will now be made by way of example only to the accompanying drawings in which.

DETAILED DESCRIPTION OF THE INVENTION

Figure 1:
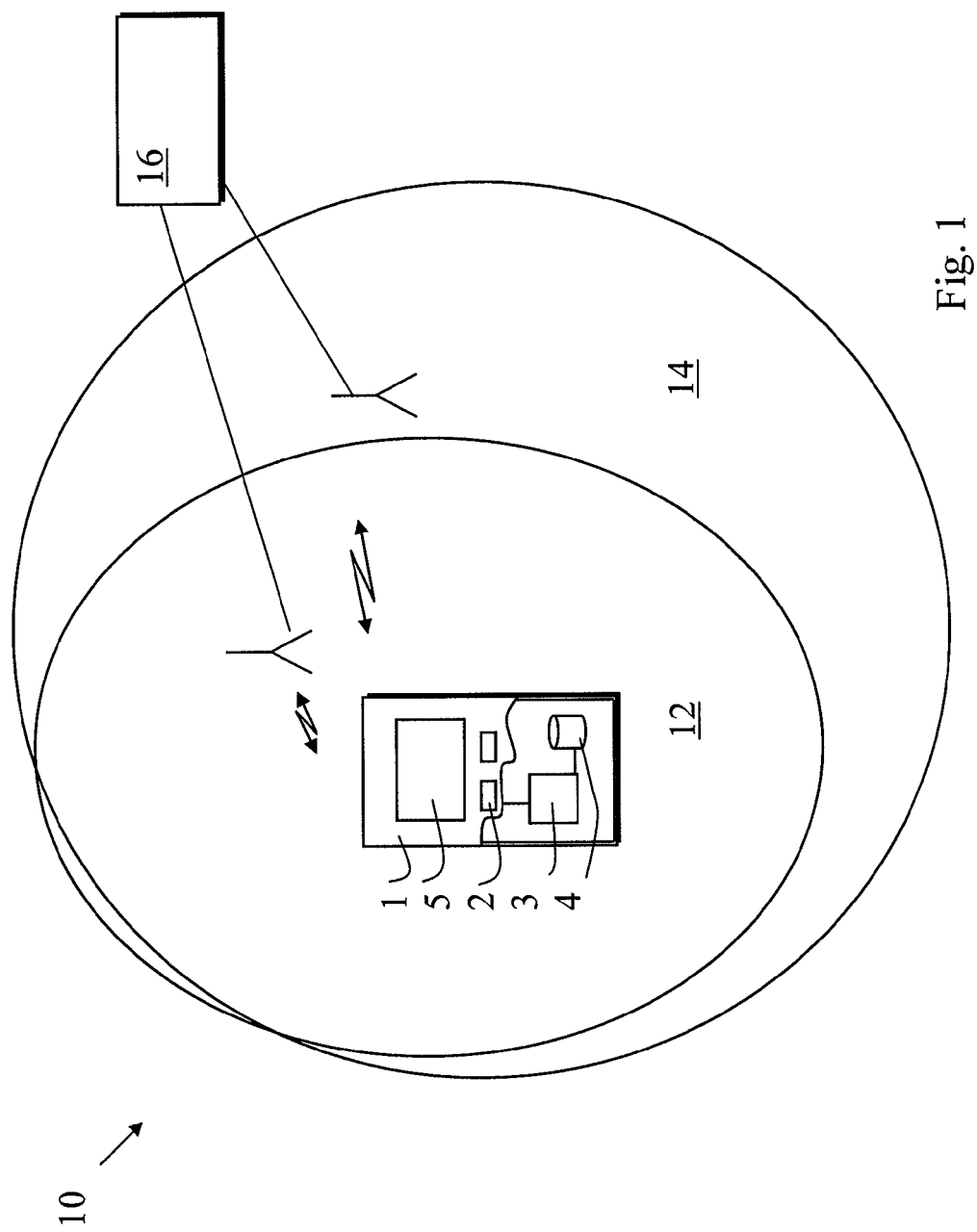
FIG. 1 shows a schematic view of a communications system comprising a plurality of access networks.

Before explaining in detail certain possible embodiments, a communication system providing mobility for the users thereof is briefly explained. A mobile communication system is typically arranged to serve a plurality of mobile communication devices 1, or user equipment. The mobile device 1 can access the system via a wireless interface between the mobile device and at least one base station. A base station is typically controlled by an appropriate controller, for example a base station controller and/or a radio access network controller.

A user may access the communication system by means of a mobile communication device such as a mobile station (MS), a personal computer, personal data assistant (PDA), portable computer, any combinations thereof or the like. A mobile communication device within a radio access network may communicate with a controller of the radio network via radio channels which are typically referred to as radio bearers. Each mobile device may have one or more radio channels open at any one time with the radio network controller. The mobile devices may be enabled for packet data communications via a communications system.

The mobile device 1 can be used for various tasks such as making and receiving phone calls, for receiving and sending data from and to a network and for experiencing, for example, multimedia or other content. The communication device is typically provided with a processor 3 and a memory 4 for accomplishing these tasks. The operation of the user equipment may be controlled by means of a suitable user interface such as key pad 2, voice commands, touch sensitive screen or pad, combinations thereof or the like. A display 5 is also typically provided. A mobile communication device may use various applications based on appropriate protocols, for example a plurality of wireless communications protocols and/or the mobile Internet protocol (IP).

The communication system 10 of FIG. 1 is configured to provide a multi-access network. In such arrangement access networks that cover at least partially same geographical area are provided, this being illustrated by the overlapping access networks 12 and 14. In other words, the mobile device 1 may access the communication system via the access network 12 or the access network 14.

The access networks 12 and 14 can be based on different access technologies. The mobile device 1 is configured accordingly for enabling access via each of the access networks, for example based on an appropriate multi-radio implementation.

Furthermore, the mobile device 1 can be handed over from one access network to the other, this type of handover being referred to as inter-system handover. The communication system is configured to be able to dynamically command and process inter-system handovers. Typically the handover process is controlled by at least one controller or a set of interconnected controllers. A controller block 16 denotes the handover controller in FIG. 1. The handover controller may be provided by any appropriate controller entity for managing and/or initiating a handover in a mobile communication system. The controller is suitably interconnected with the access networks so as to appropriately control the handover.

In an embodiment the controller 16 is configured to monitor for a predefined event. More particularly, the controller 16 may be configured to monitor if the mobile communication device 1 that is connected to the communications system via the access network 12 is in an idle state and sends only messages that do not contain any payload. For example, the communication device 1 may be detected as sending only keep alive or other dummy messages during a predefined monitoring window.

A detection of the predefined event may trigger a handover from the current radio access system 12 to the other or second radio access system 14. The predefined event may comprise, for example, detection of a predefined number of keep alive messages within a predefined time window.

The second radio access system 14 is selected based on information regarding the energy efficiency or power consumption of the communication device in said second access system. Typically, a radio access system that would require less power to maintain a communication media for the mobile device would be selected, but another type of criteria may also be used.

In addition or alternatively to monitoring for a predefined number of keep alive messages, or patterns of keep alive messages, various other events may be monitored to determine if a handover might need to be triggered. For example, a monitoring function may be arranged to detect a predefined pattern of traffic, for example frequently occurring silent periods. In such an arrangement a controller entity may monitor the traffic pattern of a subscriber, detect a certain traffic pattern, and trigger an inter-system handover to move the mobile device to an access system where the battery consumption is believed to be lower. An option is to define a threshold for the frequency of certain events, for example for the number of keep alive messages or other messages send during any inactive state of the communication device. For example, the handover may be triggered only in response to detection that the frequency is more than one message per 3 minutes.

In certain embodiments a mobile device is handed over to a radio access system where the power consumption is believed to be the lowest. In certain applications it may be necessary to consider other factors as well before initiating a handover. For example, parameters relating to congestion, capacity, quality of service (QoS) and so on may need to be taken into account when deciding whether and when to hand the terminal over from a first radio system to a second radio system.

Figures 2, 4:
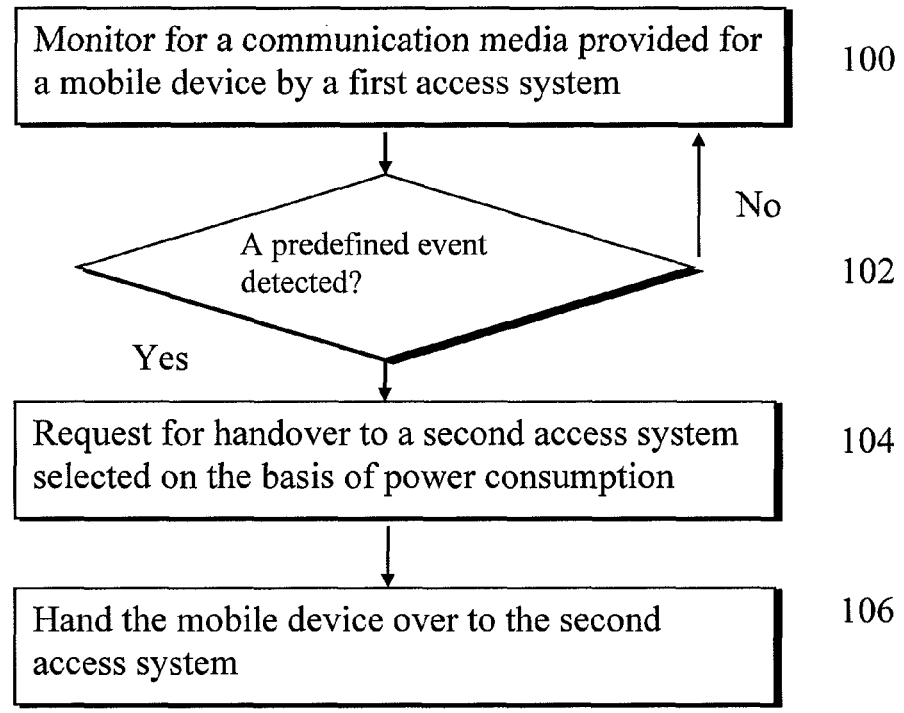
FIG. 2 shows a flowchart in accordance with an embodiment.
FIG. 4 is a table showing current consumptions in the access networks of FIG. 3.

The flowchart of FIG. 2 exemplifies the above described mechanism. A controller monitors a mobile device that is in an idle state but is provided with an active communication media with an application at 100. If a keep alive message, or a predefined number of keep alive messages, is detected at 102, an inter-system handover is triggered at 104. Otherwise the monitoring continues. The mobile device is then moved at 106 to a more efficient radio access network.

Figure 3:
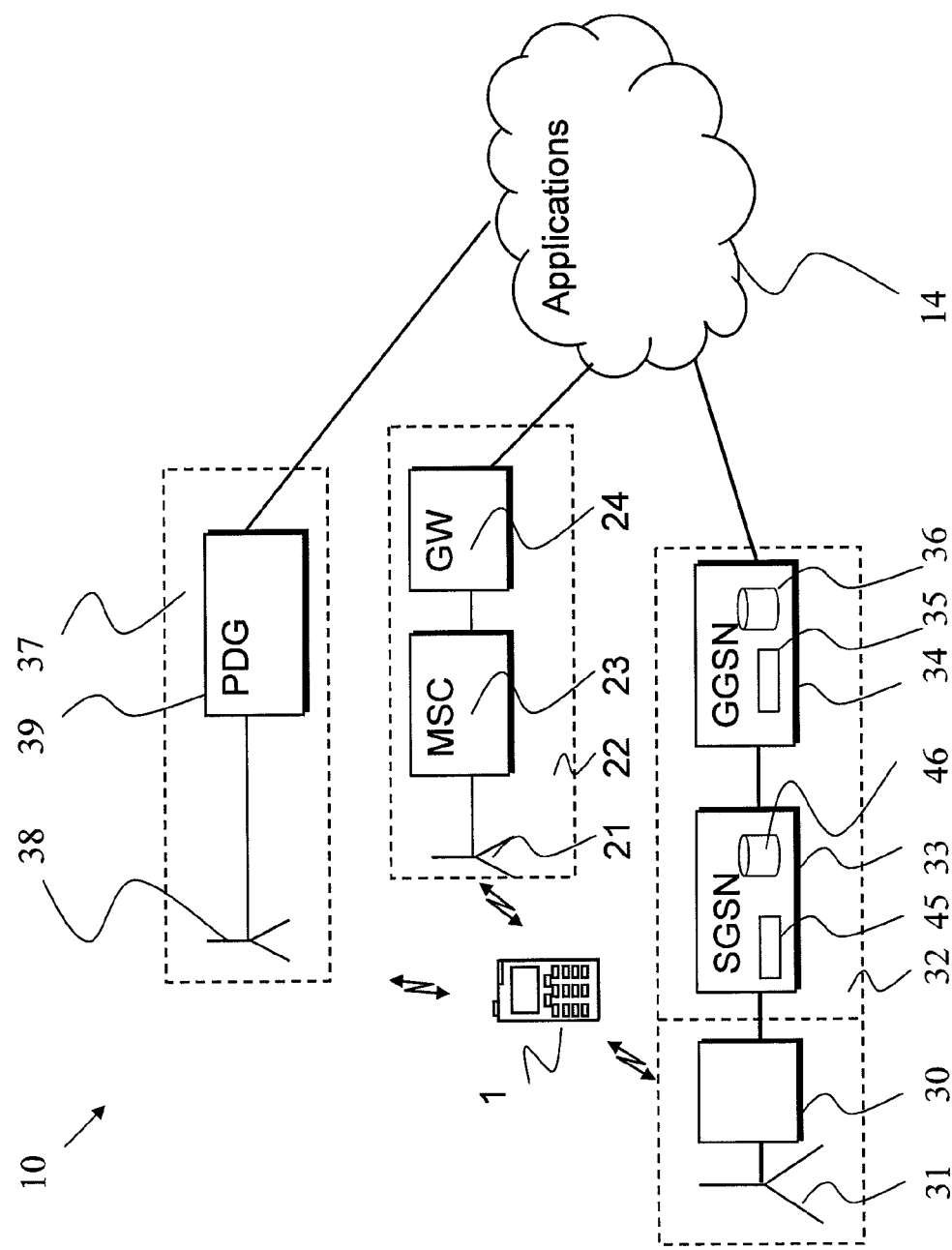
FIG. 3 is a schematic view of a possible embodiment.

FIG. 3 shows an example where a mobile device 1 may be provided with a communication media based on a second generation (2G) Global System for Mobile (GSM) network, a third generation (3G) general packet radio service (GPRS) or a wireless local area network (WLAN). In FIG. 3 the applications available for the mobile device 1 are shown by a cloud 14 for simplicity. The applications may be provided, for example, by means of the Internet, and thus the cloud 14 can be understood as, for example, denoting an IP based data network system.

More particularly, in FIG. 3 a communication network 32 may provide third generation (3G) packet switched data transmission between the support node 33 and the mobile device 1. It is noted that a packet data enabled network may comprise a number of packet data service nodes (SN). In the shown embodiment, the service node is provided by a serving GPRS support nodes (SGSN) 33. Each of the service nodes 33 is connected to at least one mobile or radio access network. The radio access network is typically understood to be provided by means of an access network controller 30 and at least one base station 31. The base station 31 is arranged to transmit signals to and receive signals from the mobile device 1. Correspondingly, the mobile device 1 is able to transmit signals to and receive signals from the base station. The network 32 in turn is connected to external data networks via a gateway GPRS support node (GGSN) 34. Thus the 3G GPRS service allows transmission of packet data between mobile communication devices and external data networks.

Overall communication between the mobile device and the GGSN can be provided by a PDP (packet data protocol) context. Each PDP context provides a communication pathway between a particular mobile device and a GGSN. Each PDP context identifies the characteristics of data to be transferred, for example quality of service (QoS), to be transferred in the PDP context. Once the PDP context is established, it can typically carry multiple flows having similar enough data transfer characteristics. Each flow normally represents, for example, a particular service and/or media component of a particular service. The PDP context therefore often represents a logical communication pathway for one or more flows across the cellular network. To implement the PDP context between the mobile device and the serving GPRS support node, radio access bearers need to be established which commonly allow for data transfer. It is noted that a mobile device may have one or more active PDP contexts at a time.

FIG. 3 shows a GSM based second generation (2G) access network 22. The 2G access network differs from the 3G network in that rather than offering packet switched communications, the connections are based on circuit switched cellular technology.

FIG. 3 shows a WLAN network 37 as further example of an access technology that provides radio access for the mobile device and due to differences in the access technology, may provide a different level of power consumption in the mobile device 1. Each WLAN is provided with at least one base station 38 and a packet data gateway 39. The data carrier can be provided by means of a number of protocols. For example, when accessing an IP network and services provided in the IP network, the IP protocol is used to carry data, UpnP (Universal plug and play) may be used to discover devices and services, and so on. The packet data gateway 39 may connect the WLAN to network 14.

In accordance with an embodiment example the GGSN 34 of the 3G network 32 can be provided with sufficient traffic analysis capability 35 to identify keep-alive messages and predefined patterns thereof. The GGSN may also be provided with appropriate memory 36 for storing data regarding the predefined conditions for event to be monitored.

The handover operation may be implemented based on a quality of service (QoS) control feature of the GGSN. The GGSN 34 may allocate by default an appropriate traffic class to the mobile device. For example, a quality of service (QoS) traffic class 'interactive' with traffic handling priority level 3 may be allocated to the mobile device 1. The controlling processor 35 of the GGSN may increase or decrease the allocated QoS class based on service rules.

If the GGSN detects that a subscriber has an active a keep-alive application, the GGSN can modify the QoS to traffic class parameter from 'interactive' to 'best effort'. This can be performed e.g. by sending an 'Update PDP context' request to the SGSN 33. The SGSN can then send a request for a radio access bearer (RAB) assignment to the controller 30 of the radio access network asking it to modify the radio access bearer (RAB) with the traffic class 'best effort'. The request may also contain a service handover information element (IE) indicating that the requested RAB should be handed over to the 2G system 22. The SGSN may be configured to always request that any 'best effort' traffic is to be handed over to the 2G system.

The communication device 1 may then camp on the cells 21 of the 2G network 22 where the battery consumption is typically lower.

If the communication device 1 starts sending traffic matching a service rule in the GGSN 34, the GGSN can again modify the QoS based on the rule configured. By means of this the normal payload traffic does not have to be downgraded. A certain QoS modification may also be used as an indication to the SGSN 33 that it needs to trigger a handover back to the 3G system. The SGSN may indicate the handover to the access network controller 30 and the mobile device 1 within a downlink packet using "cell change order" information or the like.

In another embodiment sufficient traffic analysis capability to identify keep-alive is provided in a processor entity 45 of the SGSN 33. Data storage 46 may be provided for storing any data that is required in the monitoring. In this embodiment the SGSN 33 can directly request the access network to move the communication device 1 that is detected as sending keep-alive messages to the 2G system 22. The SGSN 33 can send radio access bearer (RAB) assignment request to the controller 30 of the radio access network asking the controller to modify the RAB with a service handover information element indicating that the requested RAB should be handed over to the 2G GSM network 22. No modification of the QoS may be needed in this embodiment.

The 2G system may be provided with an appropriate adaptive timer for the application level keep alive messages. Thus, if the SGSN 33 implements the detection of the keep alive pattern, it could move the mobile device to the 2G system, and use appropriate timers in the 2G.

In accordance with a study it has been found that that an application sending keep-alive messages in the 3G environment can be more battery consuming than if these messages were sent on the 2G system. FIG. 4 shows a table listing measured current consumption values for a virtual private network (VPN) with different keep alive message intervals for 2G and 3G access systems. It is clear from the table that switching the communication media from the 3G access network to the 2G network can be used to reduce power consumption and thus to enhance battery life of the mobile device.

In a yet another example an intersystem handover between the WLAN system 37 and the 3G system 32 is provided. An appropriate handover mechanism, for example that based on IEEE 802.21 Media Independent Handoff, can be used to control the radio network selection in the communication device 1. In the embodiment the traffic pattern detection can be implemented in a HA. The HA can be provided with an interface to a media independent handover (MIH) function. If the HA detects that application level keep alive messages are transmitted, it can send an indication to the MIH function that the mobile device should be moved from the 3G system to the WLAN system. A reason for requesting for the move is that the WLAN may be, depending the circumstances, more battery efficient than the 3G system.

The power consumption of a communications device may depend significantly on the radio system that is used for communication, and therefore use of the battery capacity thereof may be optimized by the herein described mechanism. Certain embodiment may be employed to avoid use of resources of a 3G system, for example a Wideband Code Divisions Multiple access (WCDMA) or CDMA2000 for always on services when the service is not in active state.

The required data processing functions may be provided by means of one or more data processors. Appropriately adapted computer program code product may be used for implementing the embodiments, when loaded to the mobile device or any of the network nodes. The processor for running the software in, for example, a network node or a mobile device may be integrated with the existing processor of the network node or the mobile device. The program code means may, for example, perform the operation of monitoring and decision making, and of generation of messages and/or information elements required to initiate the handover. The program code product for providing the operation may be stored on and provided by means of a carrier medium such as a carrier disc, card or tape. A possibility is to download the program code product to the mobile device or any of the network entities via a data network.

It is noted that whilst embodiments of the present invention have been described in relation to communication devices such as mobile terminals, embodiments of the present invention are applicable to any other suitable type of devices suitable for communication via a communications network.

It is also noted that although certain embodiments are described herein by way of example, with reference to the exemplifying architectures of a communication system comprising certain mobile communication technologies, embodiments may be applied to any other suitable forms of communication systems and devices than those illustrated and described herein. For example, the access may be based on technologies such as UWB (Ultra Wide Band), or short range links such as the Bluetooth™ (a short range radio link), WiMax (Worldwide Interoperability for Microwave Access), the an infrared link, or a radio link for the Rfid (radio frequency identification), and so forth.

It is also noted herein that while the above describes exemplifying embodiments of the invention, there are several variations and modifications which may be made to the disclosed solution without departing from the scope of the present invention as defined in the appended claims.

That which is claimed:

1. An apparatus comprising at least one processor and at least one memory storing computer program code, wherein the at least one memory and stored computer program code are configured to, with the at least one processor, cause the apparatus to at least:
   detect at least one predefined event in communications between a communication device and a communication system, wherein the at least one predefined event is a traffic pattern comprising of at least one of voice, email, text message, data or multimedia service;
   in response to detection of said at least one predefined event, trigger a handover of the communication device from a first access system to a second access system based at least in part on an efficiency of the second access system; and
   cause the apparatus to trigger an intersystem handover in response to detection that the communication device has been idle for a predefined period and that at least one keep alive message has been transmitted.

2. An apparatus as claimed in claim 1, wherein the at least one memory and stored computer program code are configured to, with the at least one processor, further cause the apparatus to monitor for the state of the communications between the communication device and the communication system.

3. An apparatus as claimed in claim 1, wherein the at least one memory and stored computer program code are configured to, with the at least one processor, further cause the apparatus to monitor for a predefined pattern of events in the communications between the communication device and the communication system, and in response to detection of the predefined pattern of events to trigger a handover of the communication device from the first access system to the second access system.

4. An apparatus as claimed in claim 1, wherein the at least one memory and stored computer program code are configured to, with the at least one processor, further cause the apparatus to monitor for a predefined traffic pattern, and in response to detection of the predefined traffic pattern to trigger a handover of the communication device from the first access system to the second access system.

5. An apparatus as claimed in claim 1, wherein the at least one memory and stored computer program code are configured to, with the at least one processor, further cause the apparatus to monitor the frequency of predefined events, and in response to detection of a predefined frequency of one or more predefined events to trigger a handover of the communication device from the first access system to the second access system.

6. An apparatus as claimed in claim 1, wherein the at least one memory and stored computer program code are configured to, with the at least one processor, further cause the apparatus to change a quality of service parameter allocated to the communication device in response to the at least one predefined event.

7. An apparatus as claimed in claim 6, wherein the at least one memory and stored computer program code are configured to, with the at least one processor, further cause the apparatus to decrease the priority class of the communication device in response to the at least one predefined event.

8. An apparatus as claimed in claim 1, wherein the at least one memory and stored computer program code are configured to, with the at least one processor, further cause the apparatus to trigger, in response to detection that the communications between the communications device and the communication system is reactivated, a handover of the communication device from the second access system to the first access system, wherein reactivation of the communications is indicative of termination of an idle state.

9. An apparatus as claimed in claim 1, wherein the at least one memory and stored computer program code are configured to, with the at least one processor, cause the apparatus to trigger a handover to an access system with a lesser demand for power than in the first access system.

10. An apparatus comprising at least one processor and at least one memory storing computer program code, wherein the at least one memory and stored computer program code are configured to, with the at least one processor, cause the apparatus to at least:
    detect at least one predefined event in relation to power consumption thereof, wherein the detected at least one predefined event comprises a traffic pattern comprising of at least one of a voice, email, text message, data or multimedia service;
    in response to detection of said at least one predefined event, trigger a handover of the apparatus from a first access system to a second access system;
    detect that the communications between the apparatus and the communication system is to be reactivated, reactivation of the communications being indicative of termination of an idle state; and
    in response to detecting that the communications between the apparatus and the communication system is to be reactivated, triggering a handover of the communication device from the second access system to the first access system.

11. An apparatus as claimed in claim 10, wherein the at least one memory and stored computer program code are configured to, with the at least one processor, further cause the apparatus to monitor for the state of the communications between the apparatus and a communication system.

12. An apparatus as claimed in claim 10, wherein the at least one memory and stored computer program code are configured to, with the at least one processor, further cause the apparatus to monitor the state of a power source thereof.

13. An apparatus as claimed in claim 10, wherein the at least one memory and stored computer program code are configured to, with the at least one processor, further cause the apparatus to cause a handover to a less power consuming access system to be requested.

14. A method comprising:
    monitoring, by a processor, for at least one predefined event in communications between a communication device and a communication system, wherein the at least one predefined event comprises a traffic pattern comprising of at least one of a voice, email, text message, data or multimedia service;
    triggering, in response to detection of said at least one event, a handover of the communication device from a first access system to a second access system based at least in part on an efficiency thereof;
    detecting that the communications between the communications device and the communication system is to be reactivated, reactivation of the communications being indicative of termination of an idle state; and
    in response to detecting that the communications between the communications device and the communication system is to be reactivated, triggering a handover of the communication device from the second access system to the first access system.

15. A method as claimed in claim 14, wherein the monitoring comprises monitoring for the state of the communications between the communication device and the communication system.

16. A method as claimed in claim 14, wherein the monitoring comprises monitoring for a predefined pattern of events in the communications between the communication device and the communication system.

17. A method as claimed in claim 14, wherein the monitoring comprises monitoring for at least one of keep alive messages, a predefined traffic pattern, a frequency of predefined events, or the state of a power source of the communications device.

18. A method as claimed in claim 14, comprising changing of a quality of service parameter allocated to the communication device in response to detection of the predefined event.

19. A method as claimed in claim 14, comprising handing over the communications from a third generation access network to one of a second generation access network and a wireless local area network.

20. A computer program product comprising at least one non-transitory computer-readable carrier medium having computer-readable program instructions stored therein, the computer-readable program instructions comprising:
    program instructions configured to monitor for at least one predefined event in communications between a communication device and a communication system, wherein the at least one predefined event comprises a traffic pattern comprising of at least one of a voice, email, text message, data or multimedia service;
    program instructions configured to trigger, in response to detection of said at least one event, a handover of the communication device from a first access system to a second access system based at least in part on an efficiency thereof;
    program instructions configured to detect that the communications between the communications device and the communication system is to be reactivated, reactivation of the communications being indicative of termination of an idle state; and
    program instructions configured to, in response to detecting that the communications between the communications device and the communication system is to be reactivated, trigger a handover of the communication device from the second access system to the first access system.

21. A controller, the controller being configured to:
    detect at least one predefined event in communications between a mobile device and an access system, wherein the detected at least one predefined event comprises detection of transmission of a traffic pattern comprising of at least one of a voice, email, text message, data or multimedia service;
    in response to detection of said at least one predefined event, trigger a handover of the mobile device from the access system to another access system based at least in part on an efficiency of said another access system; and trigger an intersystem handover in response to detection that the communication device has been idle for a predefined period and that at least one keep alive message has been transmitted.

22. A controller of claim 21 comprising a chip for the mobile communication device.

23. An apparatus comprising at least one processor and at least one memory storing computer program code, wherein the at least one memory and stored computer program code are configured to, with the at least one processor, cause the apparatus to at least:
  detect at least one predefined event in relation to power consumption thereof, wherein the detected at least one predefined event comprises a traffic pattern comprising of at least one of a voice, email, text message, data or multimedia service;
  in response to detection of said at least one predefined event, trigger a handover of the apparatus from a first access system to a second access system; and
  cause the apparatus to trigger an intersystem handover in response to detection that the communication device has been idle for a predefined period and that at least one keep alive message has been transmitted.

24. An apparatus as claimed in claim 23, wherein the at least one memory and stored computer program code are configured to, with the at least one processor, further cause the apparatus to monitor for the state of the communications between the apparatus and a communication system.

25. An apparatus as claimed in claim 23, wherein the at least one memory and stored computer program code are configured to, with the at least one processor, further cause the apparatus to monitor the state of a power source thereof.

26. An apparatus as claimed in claim 23, wherein the at least one memory and stored computer program code are configured to, with the at least one processor, further cause the apparatus to cause a handover to a less power consuming access system to be requested.

27. A method comprising:
  monitoring, by a processor, for at least one predefined event in communications between a communication device and a communication system, wherein the at least one predefined event comprises a traffic pattern comprising of at least one of a voice, email, text message, data or multimedia service;
  triggering, in response to detection of said at least one event, a handover of the communication device from a first access system to a second access system based at least in part on an efficiency thereof; and
  triggering an intersystem handover in response to detection that the communication device has been idle for a predefined period and that at least one keep alive message has been transmitted.

28. A method as claimed in claim 27, wherein the monitoring comprises monitoring for the state of the communications between the communication device and the communication system.

29. A method as claimed in claim 27, wherein the monitoring comprises monitoring for a predefined pattern of events in the communications between the communication device and the communication system.

30. A method as claimed in claim 27, wherein the monitoring comprises monitoring for at least one of keep alive messages, a predefined traffic pattern, a frequency of predefined events, or the state of a power source of the communications device.

31. A method as claimed in claim 27, comprising changing of a quality of service parameter allocated to the communication device in response to detection of the predefined event.

32. A method as claimed in claim 27, comprising:
  detecting that the communications between the communications device and the communication system is to be reactivated, reactivation of the communications being indicative of termination of an idle state; and
  in response to detecting that the communications between the communications device and the communication system is to be reactivated, triggering a handover of the communication device from the second access system to the first access system.

33. A method as claimed in claim 27, comprising handing over the communications from a third generation access network to one of a second generation access network and a wireless local area network.

* * * * *